United States Patent [19]

Ward

[11] Patent Number: 4,604,114

[45] Date of Patent: Aug. 5, 1986

[54] FRAGRANT SCENTED AIR FILTER

[76] Inventor: Robert Ward, P.O.Box 1076, Stephenville, Tex. 76401

[21] Appl. No.: 765,443

[22] Filed: Aug. 14, 1985

[51] Int. Cl.$^4$ ............................................. B01D 39/02
[52] U.S. Cl. ...................... 55/279; 422/120; 239/60; 55/501; 55/511
[58] Field of Search ................ 55/279, 501, 511, 518, 55/DIG. 31; 422/4, 5, 120; 239/60

[56] References Cited

U.S. PATENT DOCUMENTS

| | | | |
|---|---|---|---|
| 476,269 | 6/1892 | Hill | 239/60 |
| 3,274,758 | 9/1966 | Parman | 55/279 |
| 4,028,073 | 6/1977 | Swaim | 55/279 |
| 4,118,226 | 10/1978 | Bourassa | 55/279 |
| 4,306,892 | 12/1981 | Atalla et al. | 55/279 |
| 4,563,333 | 1/1986 | Frigon | 55/279 |

FOREIGN PATENT DOCUMENTS 2825171 12/1979 Fed. Rep. of Germany ........ 55/279

Primary Examiner—Bernard Nozick
Attorney, Agent, or Firm—Diller, Ramik & Wight

[57] ABSTRACT

A fragrant scented air filter particularly adapted for use in conjunction with interior building/air conditioning systems which includes a polygonal frame of a U-shaped inwardly opening cross-section defined by a bight portion and a pair of legs, a pad of air permeable, porous, fibrous filtering material having a peripheral edge portion bordered by the frame, and at least two solid rods of fragrant scented material spanning the frame in embedded relationship to the pad and in spaced parallel relationship to each other whereby air can freely pass the same with minimum velocity reduction and maximum fragrance absorption.

13 Claims, 5 Drawing Figures

FRAGRANT SCENTED AIR FILTER

The present invention is directed to an air filter, and one which is preferably scented with a fragrance, such as lemon, lime, etc., which will be dispersed as air passes through the filter and the fragrant material sublimates and/or volatilizes.

Typical examples of such prior art air filters can be found in such prior art patents as Swaim (4,028,073); Dickinson (1,048,394); Swaim (3,902,877); Bourassa (4,118,226); Kaneyasu (3,643,040); Tvrzicky et al (1,528,640); Coleman (3,116,969); Onuki (3,820,308) and Feldman (3,577,710).

For the most part each of these prior art air filters includes one or more distinct disadvantages which are eliminated by the fragrant scented air filter of the present invention. For example, in the Swaim patents blocks of air treating agents are inserted into cavities of the filter closing the cavities and thus restricting air flow through the filter and thereby reducing the overall efficiency of the associated interior heating/air conditioning system. The air filters are also extremely complex in construction and must be relatively expensive to manufacture, particularly when it is recognized that the cakes of air treating, deodorizing and/or sanitizing material are inserted into two-part carriers before these are then inserted in the cavities of the filter. These carriers are formed from plastic material which of itself is expensive, particularly when injection molded.

In the patent to Bourassa, the filter is peripherally bounded by a layer of air freshening and/or disinfecting material while the filtering element is housed therewithin. Thus, air passes through the filtering element but little if any of the major volume of air is treated by the boundary layer of air freshening material. Thus, air velocity is maintained at a maximum but sublimation/volatilization and air scenting is totally minimized.

The patent to Onuki discloses a sterilizing air filter which is impregnated with a sterilizing agent composition, and though this has nothing to do with scenting air passing therethrough, it is an example of total immersion of an air filter in a media. From the standpoint of scenting air with a particular fragrance, it is impossible to selectively adhere fragrant material through a dipping process without either minimizing the amount of material deposited upon the overall fibrous material or blocking the interstices defined by the fibers of the filter pad. Hence, if the problem of scenting air with a fragrant media is approached from a dipping standpoint it is found wanting either from the standpoint of excessive or insufficient material deposition.

In view of the foregoing, a primary object of the present invention is to provide a novel fragrant scented air filter which maintains maximum fragrance absorption by air passing therethrough with attendant minimum velocity reduction at extremely low manufacturing and selling cost.

Specifically, the novel fragrant scented air filter of the present invention which is particularly adapted for use in conjunction with interior building heating/air conditioning systems includes a polygonal frame of a generally U-shaped inwardly opening cross-section, a pad of air permeable/porous fibrous filtering material having a polygonal peripheral edge portion bordered by the frame, the frame including a bight and a pair of opposite legs, and at least two solid rods of fragrant scented material spanning the frame in embedded relationship to the pad and in spaced generally parallel relationship to each other whereby air can freely pass the same with minimum velocity reduction and maximum fragrance absorption.

Another object of this invention is to provide a novel fragrant scented air filter as heretofore set forth wherein each rod includes an elongated central reinforcing element surrounded by the fragrant scented material.

Still another object of this invention is to provide a novel fragrant scented air filter in which the fragrant scented material has a relatively soft tacky exterior surface into which the fibrous material is at least partially embedded whereby should either rod sublimate or volatilize into pieces, the pieces will be retained in place in the filter until totally sublimated/volatilized.

With the above, and other objects in view that will hereinafter appear, the nature of the invention will be more clearly understood by reference to the following detailed description, the appended claims and the several views illustrated in the accompanying drawings.

Figure 1:
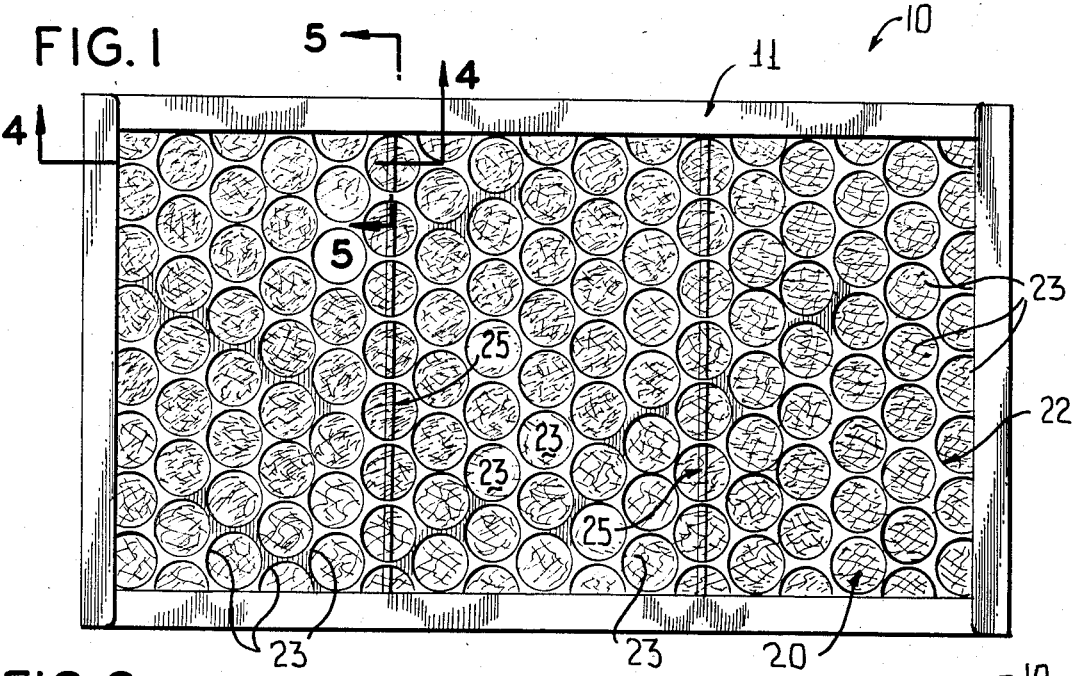
FIG. 1 is an elevational view of a novel fragrant scented air filter constructed in accordance with this invention, and illustrates two relatively narrow elongated solid generally parallel rods of fragrant scented material spanning and embedded in a pad of air permeable, porous, fibrous filtering material.

A novel fragrant scented air filter particularly adapted for use in conjunction with interior building heating/air conditioning systems is fully illustrated in the drawing and is shown designated by the reference numeral 10.

Figure 3:
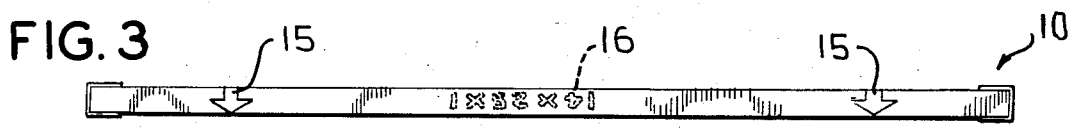
FIG. 3 is a top plan view of the fragrant scented air filter of FIGS. 1 and 2, and simply illustrates the typical indicia thereon indicating direction of air flow and filter size.
Figure 4:
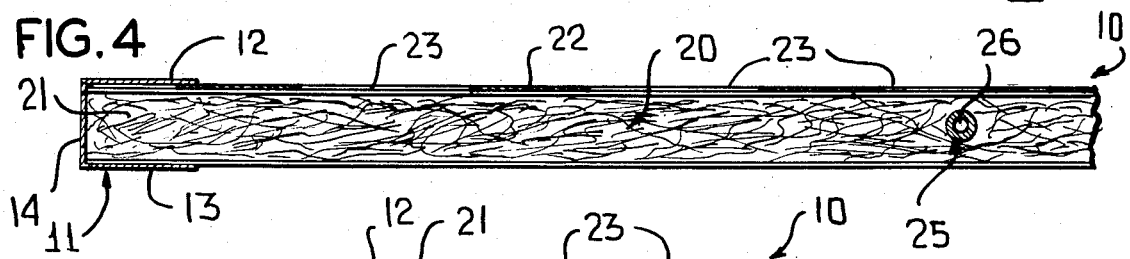
FIG. 4 is an enlarged fragmentary cross-sectional view taken generally along line 4—4 of FIG. 1 and illustrates the manner in which one of the rod of fragrant scented material is embedded in the filtering material.
Figure 5:
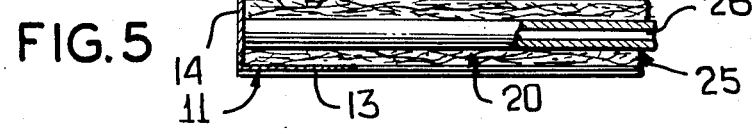
FIGURE 5 is an enlarged fragmentary sectional view taken generally along line 5—5 of FIG. 1 and illustrates the manner in which one of the two rods bottoms against a bight of the air filter frame.

The fragrant scented air filter 10 comprises a generally polygonal frame or a banding 11 formed of paper material and being of a generally inwardly opening U-shaped cross-sectional configuration defined by opposite legs 12, 13 and a bight or bight portion 14 therebetween (FIGS. 4 and 5). The bight 14 is provided with appropriate indicia 15, 16 (FIG. 3) indicating air flow direction for installation purposes and size, respectively.

The frame or banding 11 is of a generally polygonal configuration and borders or bounds a generally polygonal pad of air permeable, porous, fibrous filtering material, such as fiberglass, which is generally designated by the reference numeral 20. The filtering material or filtering pad 20 is completely conventional, and an edge 21 is totally bounded by and adhesively bonded to the leg 13 of the frame 11.

If desired means 22 in the form of thin metallic foil having a plurality of circular openings 23 is sandwiched between the pad 20 and the leg 12 of the frame 11 for providing generally planar support of the pad 20 against deflection/defibrillation thereof under the influence of air flow through the filter 10 as it passes through the filter 10 from the rear (FIG. 2) to and through the front (FIG. 1) thereof. The support means 22 might well instead take the form of two wires crossing from the corners (unnumbered) of the frame 11, which is also typical of air filter constructions. It is sufficient for the purpose of the invention to recognize that the planar support 22 supports and maintains the overall shape, size and integrity of the relatively loose fiberglass filtering material pad 20.

In order to provide fragrant scented air, the fragrant scented air filter 10 includes a pair of generally solid rods of fragrant scented material spanning the frame 11 and being in embedded relationship to the pad 20, each of the rods being identical and each being generally designated by the reference numeral 25. While each rod 25 is illustrated as being a tube, it might also be a solid elongated cylinder. However, in the illustrated embodiment of the invention each rod 25 is tubular and receives telescopically internally thereof a metallic reinforcing and supporting rod or element 26 which is preferably made of metallic material. The fragrant scented rod 25 is formed of fragrant scented material, the ingredients of which are, in order of predominance, water, carrageenan, emulsifier, fragrance (orange, lemon, lime, etc.), cellulose gum, preservative and coloring. The material is relatively soft and tacky at normal ambient room temperature (60°–80° F.) and hence, when inserted generally centrally of the pad 20, will have at least partially embedded therein adjacent fibers of the fibrous material of the pad 20. This soft, tacky exterior surface characteristic of the fragrant material of the rods 25 is important because, as air passes through the air filter 10, the material is subject to high sublimation and/or volatilization, and under normal conditions this does not occur in a uniform and regular fashion across the entire length of each of the rods 25. Hence, each rod 25 might sublimate progressively into two, three or more pieces, and in the absence of the soft tacky exterior they might simply fall to a position outside the main air stream passing through the filter 10, thus decreasing the efficiency thereof. Obviously, the same tacky characteristic adheres the fragrant scented material to the elongated element 26, and should the rods 25 sublimate or volatilize into a plurality of pieces, they will maintain their position within the fibrous filtering pad 20. Even absent the elongated reinforcing and supporting element 26, the tacky exterior nature of each rod 25 will assure that any pieces created due to sublimation/volatilization will remain as originally positioned within the pad 20. In this manner air can freely pass through the pad 20 with minimum velocity reduction due to the relatively narrow, yet long length of the rods 25 while maximum fragrance absorption will occur since even under the most adverse conditions of sublimation/volatilization the rods 25, or pieces thereof, will be maintained exactly where originally positioned.

Figure 2:
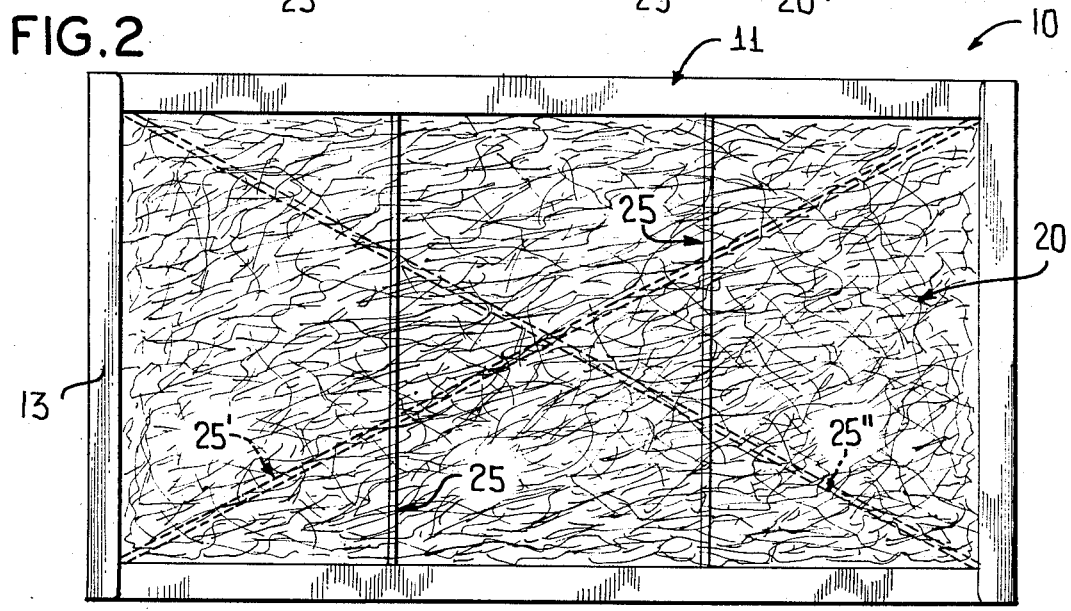
FIG. 2 is a rear elevational view of the fragrant scented air filter and illustrates the fragrant scented rods from the rear side of the filter.

It should also be noted that because the rods expand the entire width of the frame 11 between opposite bight portions thereof, and actually bottom against these bight portions 14 (see FIG. 5), the rods 25 also function to support the pad 20 against adverse effects of air flow therethrough. Hence, the position of the rods and the strength thereof, particularly when reinforced by the metallic elongated elements 26, functions not only to scent the air, but also to support the pad 20 much as in the case of the planar support 22. As a matter of fact, under low velocity air conditions, the planar support 22 need not be part of the overall filter, and the support afforded thereby is instead simply supported by the rods 25. Obviously, in further keeping with the present invention more or less of the rods 25 can be provided, although two rods based in parallel relationship to each other and dividing the air filter into thirds, as best illustrated in FIGS. 1 and 2, has been found to be basically optimum from the standpoint of production cost and utilization efficiency. Furthermore, though the rods 25 can be tubular or solid, centrally reinforced or not, they may also be disposed otherwise than in spaced parallel relationship to each other. The rods 25 may, for example, run from corner to corner in crossed relationship, but in this case the rods preferably are of a double-ended frusto-conical configuration narrower in diameter at both ends and widest at the center of the pad 20, which is also the crossing point of both such rods emanating from opposite corners of the frame 11. In this fashion maximum volume of the fragrant scented material is located at the center portion of the pad 20 at the point of generally maximum air flow whereas lesser volume of the fragrant scented material is positioned adjacent the corners of the frame. Two such fragrant scented rods 25' and 25" are illustrated in FIG. 2 simply as an example of the end-to-end configuration thereof, and the maximization of the fragrant scented material at the crossing point of the rods 25', 25".

Although in a preferred embodiment of the invention as has been specifically illustrated and described herein, it is to be understood that minor variations may be made in the apparatus without departing from the spirit and scope of the invention, as defined in the appended claims.

As an example of the latter, the ends of any one of the fragrant scented rods 25' or 25" can be pointed so that the same might be more readily "threaded" into the fibrous material of the pad 20. Furthermore, in those cases where the supporting rod 26 is not utilized and the fragrant scented rods 25, 25' or 25" are simply made of only the fragrant scented material, the material is preferably of a hard consistency so that these rods can be easily "threaded" through the fibrous pad 20 in the absence of bending, breakage or the like.

As an alternative to the fragrant scented rods 25, 25' and/or 25" heretofore described, the invention further contemplates a fragrant scented rod formed from permeable or perforated paper tubing or perforated plastic tubing (not shown) of a quarter-inch–one-half inch internal diameter which is filled with solid or granular fragrant scented material (also not shown) with the ends of the plastic or paper tube being crimped or otherwise closed. Such fragrant scented rods are of a length corresponding to the rods 25, 25' and/or 25", and are similarly threaded into the fibrous pad 20 as described heretofore. As air passed through the filter 10 it will flow through the permeable and/or perforated paper and plastic, volatilize or sublimate the solid or granular fragrant scented material therein, and thus scent the air associated with the air system of an associated building.

I claim:

1. A fragrant scented air filter particularly adapted for use in conjunction with interior building heating/air conditioning systems comprising a generally polygonal frame of a U-shaped inwardly opening cross section, a pad of air permeable/porous fibrous filtering material having a polygonal peripheral edge portion bordered by said frame, said frame including a bight and a pair of opposite legs, means sandwiched between said pad and one of said legs for providing generally planar support of said pad against deflection/defibrillation thereof under the influence of air flow through said filter, and at least two solid rods of fragrant scented material spanning said frame in embedded relationship to said pad and in spaced relationship to each other whereby air can freely pass the same with minimum velocity reduction and maximum fragrance absorption.

2. The fragrant scented air filter as defined in claim 1 wherein said rods each include an elongated central reinforcing element surrounded by said fragrant scented material.

3. The fragrant scented air filter as defined in claim 1 wherein said rods are in generally parallel relationship to each other.

4. The fragrant scented air filter as defined in claim 1 wherein said fragrant scented material has a relatively soft tacky exterior surface into which the fibrous material is at least partially embedded whereby should either rod sublimate or volatilize into pieces the pieces will be retained in place.

5. The fragrant scented air filter as defined in claim 2 wherein said rods are in generally parallel relationship to each other.

6. The fragrant scented air filter as defined in claim 2 wherein said fragrant scented material has a relatively soft tacky exterior surface into which the fibrous material is at least partially embedded whereby should either rod sublimate or volatilize into pieces the pieces will be retained in place.

7. The fragrant scented air filter as defined in claim 3 wherein said fragrant scented material has a relatively soft tacky exterior surface into which the fibrous material is at least partially embedded whereby should either rod sublimate or volatilize into pieces the pieces will be retained in place.

8. The fragrant scented air filter as defined in claim 7 wherein said rods each include an elongated central reinforcing element surrounded by said fragrant scented material.

9. A fragrant scented air filter particularly adapted for use in conjunction with interior building heating/air conditioning systems comprising a frame, a pad of air permeable/ porous fibrous filtering material bordered by said frame, a porous tube in embedded relationship relative to said pad, and particulate fragrant scented material in said porous tube whereby air can freely pass through the porous tube and the particulate fragrant scented material with minimum velocity reduction and maximum fragrance absorption.

10. The fragrant scented air filter as defined in claim 9 wherein said porous tube is a plastic sheet having a plurality of minute perforations therein of a size precluding exit of the particulate material, yet permitting free air flow therethrough.

11. The fragrant scented air filter as defined in claim 10 wherein said porous tube spans said frame.

12. The fragrant scented air filter as defined in claim 9 wherein said porous tube is constructed from porous paper.

13. The fragrant scented air filter as defined in claim 12 wherein said porous tube spans said frame.

* * * * *